Dec. 30, 1941.  J. S. RODGERS  2,268,225
APPARATUS FOR REPAIRING TRACTION BELTS
Filed Feb. 10, 1941  5 Sheets-Sheet 2

INVENTOR
JAMES S. RODGERS
By Paul, Paul Moore
ATTORNEYS

Dec. 30, 1941.    J. S. RODGERS    2,268,225
APPARATUS FOR REPAIRING TRACTION BELTS
Filed Feb. 10, 1941    5 Sheets-Sheet 3

INVENTOR
JAMES S. RODGERS
By Paul, Paul & Moore
ATTORNEYS

INVENTOR
JAMES S. RODGERS
ATTORNEYS

Patented Dec. 30, 1941

2,268,225

UNITED STATES PATENT OFFICE 2,268,225

APPARATUS FOR REPAIRING TRACTION BELTS

James S. Rodgers, Minneapolis, Minn., assignor to Rodgers Hydraulic Incorporated, Minneapolis, Minn., a corporation of Minnesota Application February 10, 1941, Serial No. 378,315

12 Claims. (Cl. 59—7)

This invention relates to a new and improved apparatus for repairing traction belts of crawler type tractors and similar vehicles.

Traction belts of crawler type tractors or vehicles, as is well known, are composed of a plurality of pairs of links pivotally connected together by suitable pivot pins and bushings to form an endless belt. Suitable ground engaging elements or traction plates are secured to said links to complete the formation of the traction belt. The pivot pins and bushings are fixedly secured in their respective links, usually by a press fit, and frequently become worn as a result of the pivotal action of the links in the operation of the belts, when the tractor is being moved about from place to place. When the pivot pins and bushings become worn to a certain extent, it becomes necessary to remove and reset them, or substitute new ones therefor. Because the pivot pins and bushings are secured to the links by a press fit, it is frequently difficult to remove them from their respective links and reset them, or substitute new ones therefor, particularly when the lateral spacing between the links of each pair of links must be accurately maintained. Such accurate lateral spacing of the links is necessary, in order that the bolt holes in the traction plates will register with the holes in the links, when the traction plates are again secured to the links, after the worn pins and bushings have been reset, or replaced by new ones. When the pairs of links are assembled in the manufacture of a traction belt, suitable clearance is provided between the ends of the links of adjacent pairs of links, to provide free pivotal movement of the links. This clearance must be maintained and, of course, is dependent upon the lateral spacing of the links. It will therefore be understood that it is of utmost importance that the lateral spacing of the links be accurately maintained in the operation of replacing worn pivot pins and/or bushings in the belt.

An object of the present invention therefore, is to provide an apparatus having means whereby the worn pins and bushings may readily be forced out of the bores in their respective links and new ones substituted therefor without danger of changing the lateral spacing of the links of each pair of links.

A further object is to provide an apparatus comprising a table for supporting a portion of a traction belt and having a thrust member positioned adjacent thereto adapted to provide a lateral support for one link of a pair of links, and a movable jaw being spaced from said thrust member and adapted to be moved to a position to provide a lateral support in the same direction for the other link of a given pair of links, whereby when pressure is exerted against the end of a pivot pin mounted in said links, both links will be laterally supported, whereby the pivot pin may readily be forced out of said links without danger of damaging the links or varying the lateral spacing therebetween.

A further object is to provide an apparatus of the class described having means for independently supporting both links of a given pair of links of a traction belt, during the operation of removing worn pins or bushings therefrom, and also during the operation of pressing new pins or bushings into the links, the supporting means for said links being so arranged that when pressure is applied against the pins or bushings, the links being operated upon, cannot accidentally become detached from their supporting means, which greatly adds to the safety of removing the worn pins and bushings from a traction belt and substituting new ones therefor.

A further object is to provide an apparatus of the class described, comprising a work-supporting table having a relatively fixed thrust member arranged adjacent thereto adapted to provide a lateral support for one link of a given pair of links, and a retractable jaw being positioned in the path of travel of the traction belt and normally positioned below the traction belt, whereby the latter may readily be moved over the surface of the table from one position to another, and said retractable jaw having means for readily moving it into a position against the inner side of the other link of said given pair of links to provide a lateral support therefor during the operation of removing worn pivot pins or bushings therefrom, or pressing new ones into said links.

Other objects of the invention reside in the unique construction of the retractable jaw and its operating means whereby it may readily be moved into or out of operating position, and also whereby it may be quickly adjusted relatively to the fixed thrust member to adjust the spacing between the working faces of the thrust member and said retractable jaw to correspond to the spacing between the outer and inner faces of the links of a given pair of links; in the means provided for varying the spacing between the forks of the upper end of the retractable jaw, whereby said spacing may be made to coincide with the diameter of the bushing to be inserted, and whereby the bushing will be axially alined with the ram or pressure member; in the means provided for adjusting the retractable jaw in a direction crosswise to the travel of the ram, whereby the retractable jaw, in addition to providing a support for one of the links of a given pair of said links, may also be utilized to accurately aline the bushing or pivot pin with the ram or pressure member; and, in the provision of a simple apparatus for repairing traction belts of both the "recessed" and "flush" types.

Other objects of the invention will appear from the following description and accompanying drawings and will be pointed out in the annexed claims.

Figure 1:
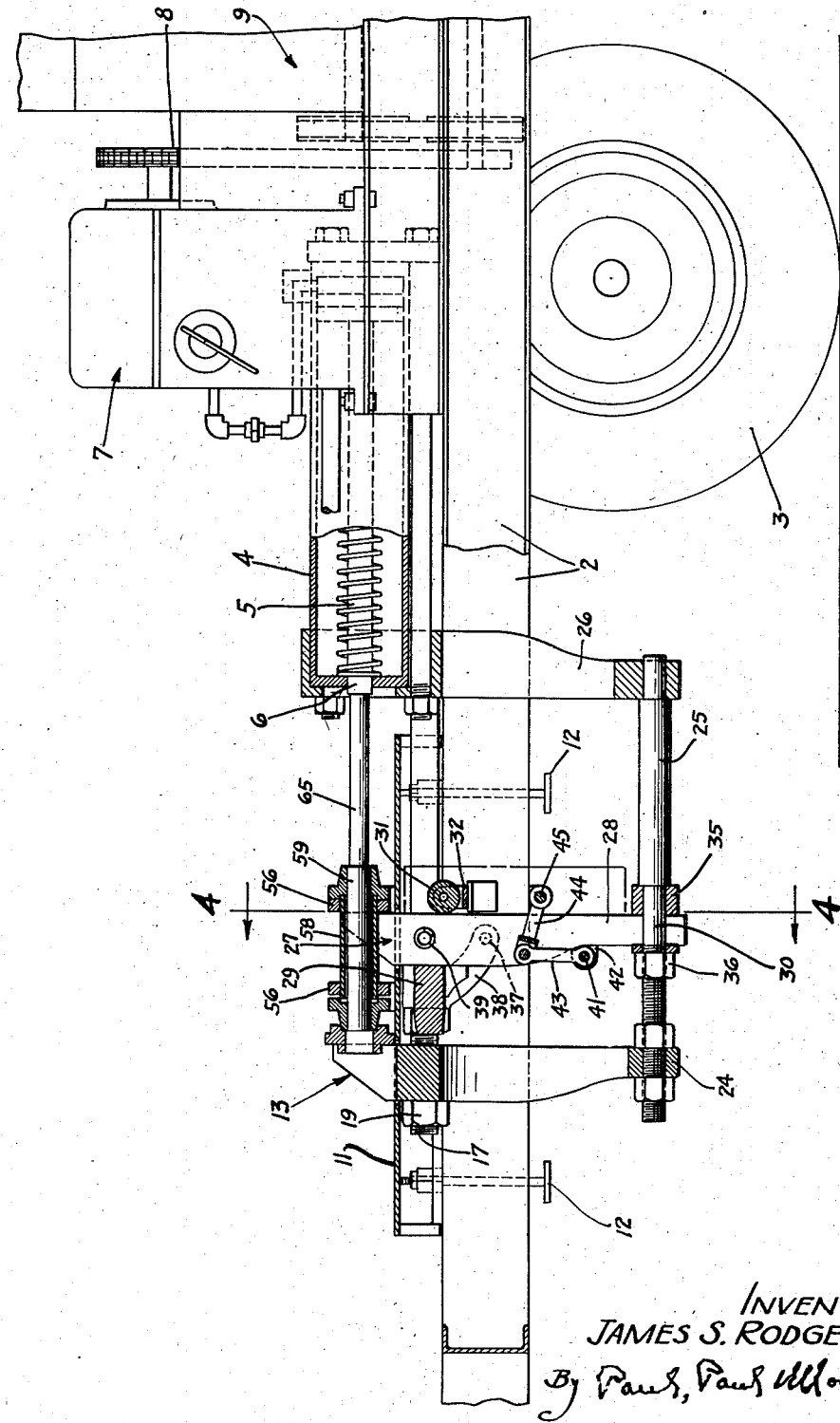
Figure 1 is a sectional elevation of a portion of a power press showing my invention embodied therein.
Figure 2:
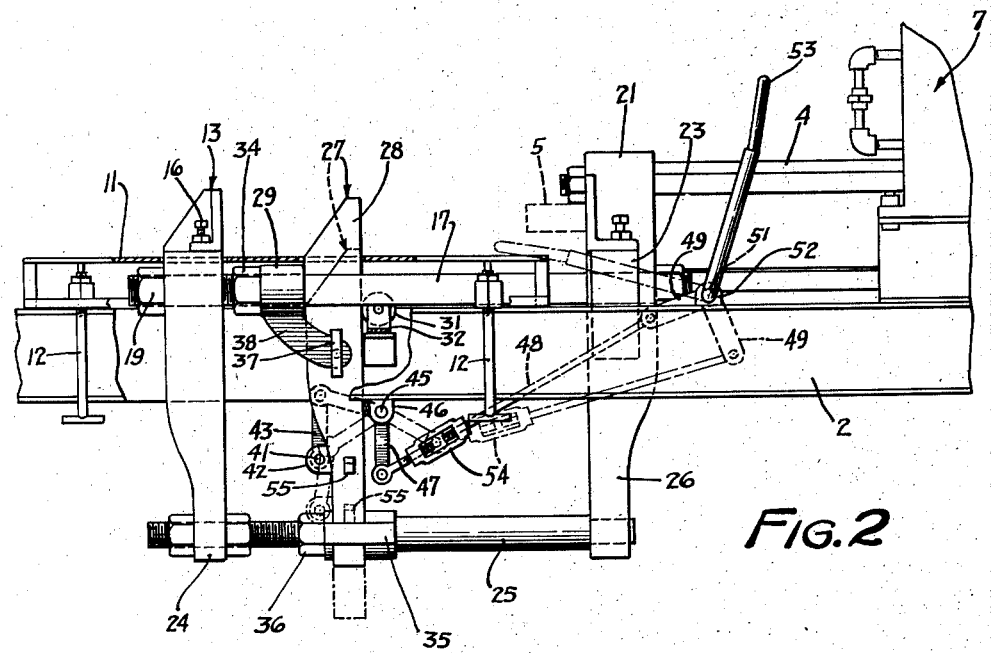
Figure 2 is a side elevation of Fig. 1, with some of the parts omitted, showing the means for vertically moving the retractable jaw.

In the selected embodiment of the invention here shown, there is illustrated in Figures 1 and 2, for purposes of disclosure, a portion of a portable press comprising side frame members 2 supported upon suitable carying wheels 3. A hydraulic cylinder 4 is mounted on the frame and has a ram 5 operatively mounted therein, adapted to be projected from one end of the cylinder, as shown at 6 in Figure 1.

Means, generally designated by the numeral 7, is provided for circulating the fluid to and from the cylinder 4. The fluid circulating means may be driven by a suitable chain drive 8 from an engine or other power device, generally indicated by the numeral 9. The fluid circulating means is shown and described in my copending application, Serial Number 191,277, filed February 18, 1938.

Figure 3:
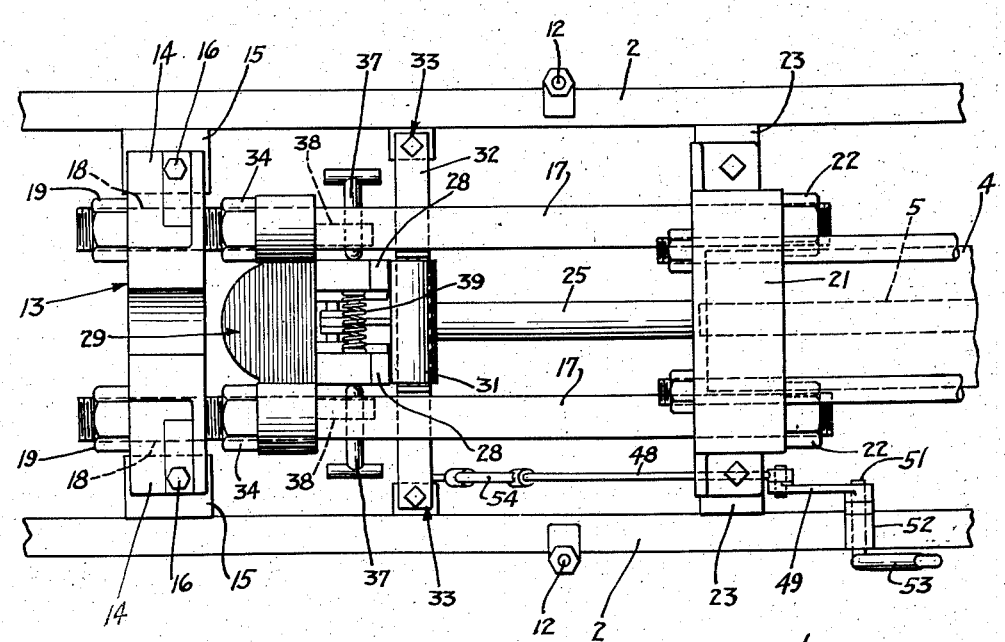
Figure 3 is a plan view of Figure 2.

An important feature of the present invention resides in the novel construction of the means provided for supporting the links of a traction belt during the operation of removing worn pivot pins or bushings therefrom and substituting new ones therefor. As best shown in Figures 1, 2, and 3, a suitable supporting table 11 is mounted on the machine frame 2 and is vertically adjustable thereon by suitable adjusting screws 12, whereby the table may be properly positioned with respect to the ram 5.

Figure 4:
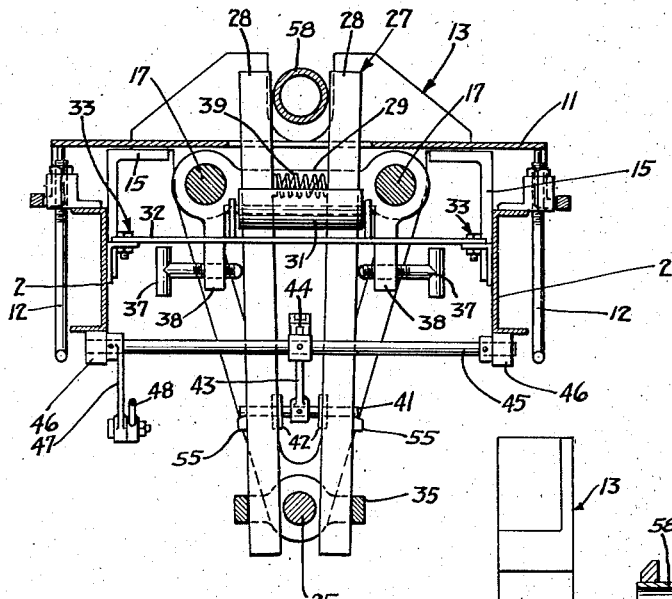
Figure 4 is a cross sectional view substantially on the line 4—4 of Figure 1, showing the retractable jaw in operative position.

A suitable thrust member, generally designated by the numeral 13, is shown provided with outwardly extending lugs 14 which are supported on brackets 15 secured to the side frame members 2, as shown in Figure 4. Adjusting screws 16 are provided in the lugs 14 for vertically adjusting the thrust member 13 with respect to the cylinder 4. The table 11 is provided with a suitable opening for receiving the thrust member 13.

Suitable tension rods 17 are provided directly below the table 11 and have their rear end portions received in suitable openings 18 provided in the thrust member 13. Nuts 19 are received in threaded engagement with the ends of the rods 17 to support the thrust member thereon. The opposite ends of the tension rods 17 are secured to a suitable transverse bracket 21 by nuts 22, as best shown in Figure 3. The bracket 21 is supported on inwardly extending brackets 23 secured to the side frame members 2, as will be understood by reference to Figure 3.

The thrust member 13 extends downwardly below the frame members 2 and has its lower end portion 24 apertured to receive one end of a thrust rod 25, the opposite end of which is supported in a hanger 26 shown provided on the bracket 21. By thus supporting the thrust member 13 on the frame of the machine, it will readily be noted that it may be relatively adjusted with respect to the ram to align it therewith. In use, the tension rods 17 and thrust rod 25 cooperate to retain the thrust member in accurately spaced relation to the hydraulic cylinder 4.

In operation of removing worn pivot pins and bushings from the links of a traction belt and pressing new ones therein, it is essential that the links be so supported on the work table 11 that the strain exerted against the pivot pins and bushings will not damage the links or vary the lateral spacing between the links of each pair of links, when the new pivot pins and bushings are pressed thereinto. To afford a clearer explanation of the apparatus, it must be understood that a traction belt is composed of pairs of links pivotally connected together to form an endless traction belt, and that the lateral spacing between the links of each pair of links must be accurately maintained in order that the bolt holes in the ground engaging elements or plates will register with the corresponding openings in the links of the ground engaging elements or plates, when said plates are again to be secured to the links. To maintain such accurate spacing between the links of each pair of links, and to avoid subjecting the links to excessive strains, when removing worn pins and bushings therefrom, or pressing new ones into the links, it is highly desirable that means be provided, whereby both links of a pair of links may be laterally supported during such operation thereon.

To thus support both links of each pair of links, a retractable jaw, generally designated by the numeral 27, is interposed between the thrust member 13 and ram 5, as clearly illustrated in Figures 1, 2, and 3. The jaw 27 is mounted for vertical movement relative to the table 11, in order that it might be retracted or moved downwardly out of the path of a traction belt positioned on the table, to permit the traction belt to be moved across the table 11 in the operation of positioning another set of pivot pins and bushings in operative relation to the ram 5 and thrust member 13, as will be understood by reference to Figure 9.

The retractable jaw 27 is shown composed of two upright elongated bars 28, having their upper portions received between a cross bar 29 and a suitable roller 31, shown mounted on a cross member 32 having its end portions suitably supported on the side frame members 2 by suitable brackets and bolts, as indicated at 33 in Figure 4. The cross bar 29 is mounted on the tension rods 17, and is fixed against relative movement thereon by suitable nuts 34 received in threaded engagement with the rods 17, as clearly shown in Figure 3.

The lower ends of the jaw members 28 are slidably supported in a yoke shaped bracket 35 mounted on the reduced end portion 30 of the thrust rod 25 and secured thereto by a nut 36, as clearly illustrated in Figure 1. Suitable adjusting screws 37 are shown provided in depending lugs 38 of the cross bar 29, and have their inner terminals engaging the outer surfaces of the jaw members 28, whereby the spacing between the upper ends thereof may be varied to correspond to the diameter of the bushings to be operated upon. A suitable spring 39 may be interposed between the jaw members 28 to constantly exert an outward pressure thereon, whereby they are held in contact with the terminals of the adjusting screws 37.

The means provided for retracting the jaw 27 to an inoperative position, is best shown in Figure 2, and comprises a rod 41 pivotally supported in suitable lugs 42 provided on the lower portions of the jaw members 28, as shown in Figures 1 and 4. A suitable link 43 has one end pivotally connected to the rod 41 and its opposite end to one end of an arm 44 secured to a cross shaft 45 journaled in suitable bearings 46 secured to the side frame members 2, as best shown in Figure 4. An arm 47 is secured to the cross shaft 45 and has one end of a connecting rod 48 pivotally connected thereto. The opposite end of the connecting rod 48 is pivoted to an arm 49 secured to one end of a crank shaft 51, journaled in a suitable bearing 52 secured to one of the frame members 2. The crank shaft 51 is shown having a lever 53 integrally formed therewith which projects upwardly, as shown in Figure 2, whereby it may be conveniently manipulated by an operator standing alongside the machine. A suitable turn buckle 54 is shown provided in the connecting rod 48, whereby the retractable jaw 27 may be vertically adjusted with respect to the table 11.

The jaw members 28 are provided with means for limiting their downward movement. Such means may consist of outwardly projecting lugs 55, shown integrally formed with the jaw members 28, and which lugs are adapted to engage the yoke 35, as indicated in dotted lines in Figure 2, when the retractable jaw 27 is in its lowermost position, indicated by the dotted lines in Figure 2.

The arm 49 of the operating lever 53 is so arranged with respect to the crank shaft 51 and the pivotal connection between the lower end of the connecting rod 48 and the arm 47, that when the operating lever 53 is in its operative position, shown in full lines in Figure 2, the pivotal connection between the upper end of the connecting rod 48 and the arm 49 will pass over center, to thereby lock the retractable jaw 27 in its elevated operative position, shown in full lines in Figure 2.

There are now in common use, two types of crawler type traction belts. One is commonly known as the "recessed" type and is shown in Figures 5, 6, 7, and 8, and the other is the "flush" type, shown in Figures 9, 10, 11, and 12.

Figure 5:
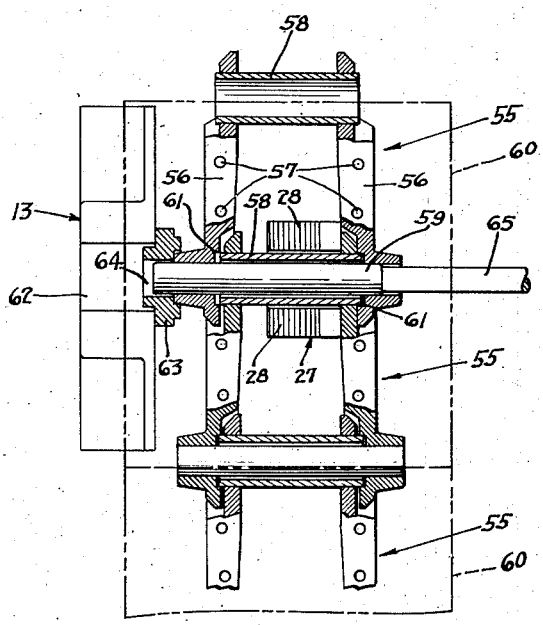
Figure 5 is a plan view of a portion of a traction belt of the "recessed" type, showing a pair of its links supported by the thrust member and the retractable jaw, as when removing a pivot pin therefrom.

The recessed type of belt comprises a plurality of pairs of links, generally designated by the numeral 55, each comprising laterally spaced links 56 having suitable bolt holes 57 therein for receiving the bolts for securing thereto, the usual ground engaging elements or plates 60, indicated in dotted lines in Figure 5. Contiguous pairs of links 55 are pivotally connected together by suitable bushings 58 and pivot pins 59. The bushings and pivot pins are secured in their respective links by press fits, as hereinbefore stated, and which is common practice in the trade.

The "recessed" type of traction belt distinguishes from the "flush" type in that the ends of the bushings 58 project slightly beyond the outer surfaces of the links 56, as clearly illustrated in the upper portion of Figure 5. The projecting end portions of the links are adapted to be received in shallow recesses 61, provided in the inner faces of the links, as shown. In the "recessed" type of traction belt, removal of the pivot pins 59 may not separate the pairs of links from one another, particularly if the ground engaging plates 60 are not detached from the links. To uncouple adjacent pairs of links from one another in the "recessed" type of belt, it is necessary that the ground engaging elements or plates 60 be removed from the links in order that the complemental links of a pair of links may be spread sufficiently to permit the removal of the ends of the bushings from the recesses 61.

In assembling the traction belt, it is of utmost importance that the lateral spacing between the complemental links of each pair of links be accurately maintained in order that the bolt holes in the ground engaging elements or plates 60 may register with the holes 57 in the links 56.

In the "flush" type of traction belt, as shown in Figures 9, 10, 11, and 12, the ends of the bushings 58 are flush with the outer faces of the links 56, when the belt is assembled. In this type of belt, the pairs of links may readily be separated from one another when the pivot pins 59 are removed from the links, as will readily be understood by reference to Figure 9.

By the use of the novel retractable jaw herein disclosed, the lateral spacing between the links of each pair of links may be accurately maintained in the operation of pressing the worn pins and bushings out of the links, and when pressing new pins or bushings into the links. In the operation of removing the pivot pins from the links of a traction belt of the "recessed" type, as shown in Figures 5, 6, 7 and 8, the traction belt is placed on the work table 11 between the thrust member 13 and ram 5, as shown in Figure 1. The pivot pin to be removed is then alined with the ram 5 and an opening 62 provided in the thrust member 13. A suitable adaptor 63 is positioned against the thrust member 13, and has a hub extending partially into the opening 62. The opposite end of the adaptor 63 is counterbored to receive the end of the hub of the adjacent link 56, whereby the pivot pin 59 is alined with the bore 64 in the adaptor 63.

The retractable jaw is then moved into operative position by manipulation of the lever 53, until the upper ends of the jaw members 28 engage the inner face or side of one of the links at the opposite side of the traction belt, as clearly illustrated in Figure 5. The spacing between the working faces of the thrust member 13 and retractable jaw 27 is adjusted to correspond to the spacing of the links by adjustment of the nuts 19 on the tension rods 17. The spacing between the upper ends of the jaw members 28 is also adjusted to correspond to the diameter of the bushing. Thus, when the retractable jaw is moved upwardly into operative position, as shown in Figures 1, 2, and 4, the upper end of the jaw members 28 will maintain the bushings in axial alinement with the ram 6 in a horizontal direction. The vertical alinement of the bushings with the ram is accomplished by manipulation of the table adjusting screws 12.

Figure 6:
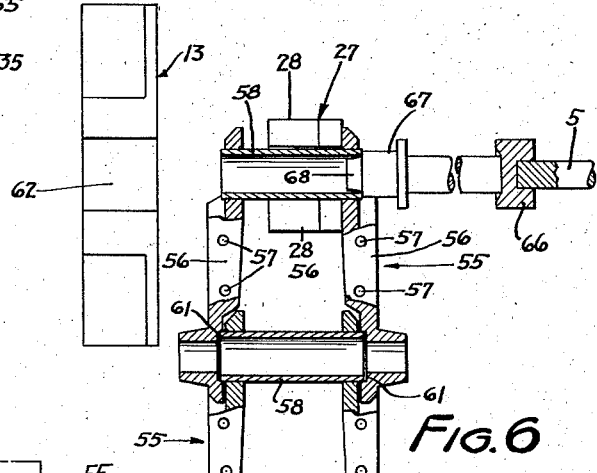
Figure 6 is a view showing the means employed for removing bushings from links of the type shown in Figure 5.

When the pivot pin to be removed, has been alined with the adaptor 63 and ram 5, one end of a pusher pin 65 is positioned against an end of the pivot pin 59, and the opposite end of the pusher pin is engaged with a fitting 66 provided at the end of the ram 5, as best shown in Figure 6. The fluid circulating mechanism is then set into motion, whereupon the ram is thrust forwardly and thereby forces the worn pivot pin 59 out of the hubs of the links 56, as clearly illustrated in Figures 5 and 9. During the operation of forcing the worn pivot pin out of the links, as shown in Figure 5, the lateral spacing between the links is accurately maintained by the thrust member 13 and retractable jaw 27, as will readily be understood.

Figure 7:
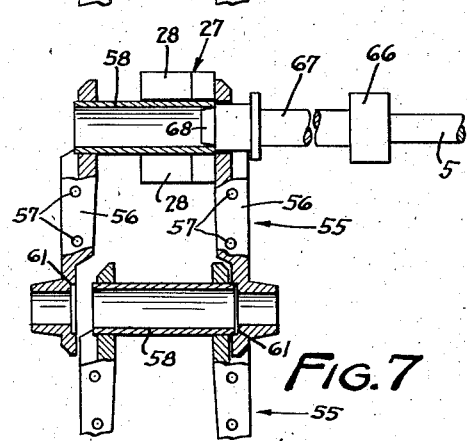
Figure 7 is a view similar to Figure 6, but showing one end of the bushing pressed out of its respective link.

To remove worn bushings from the links 56 of a recessed type of traction belt, one of the links of a pair of links is positioned against the retractable jaw, as shown in Figure 6. A pusher pin 67, having a reduced end portion 68, is then fitted against the end of the bushing, after which pressure is applied to the pusher pin 67 by the ram 5, through the fitting 66. Forward movement of the pusher pin 67 will force the adjacent end of the bushing out of the adjacent link 56, as shown in Figure 7. The pusher pin 67 is then withdrawn from the opening in the adjacent link 56, after which the other link of the pair is placed against the retractable jaw 27, preferably by inverting said link. The bushing is then pressed out of the second link in a manner similar to the operation shown in Figure 6.

Figure 8:
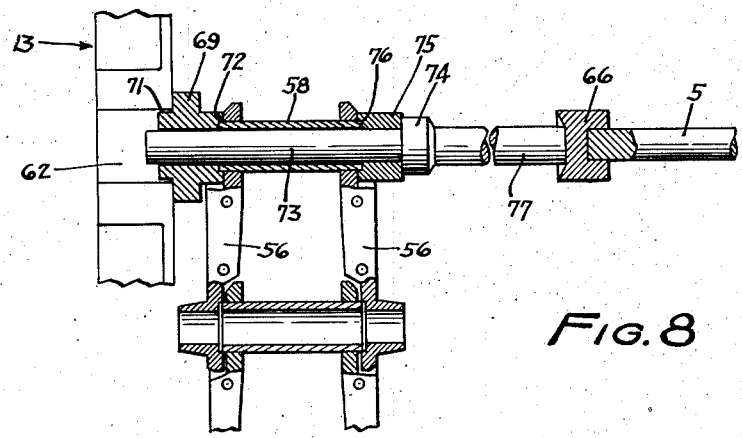
Figure 8 is a view showing the means employed in the operation of pressing a bushing into a pair of links of the "recessed" type.

When pressing new bushings into a pair of links, the pair of links are placed on the work table 11 with one of the links engaged with an adaptor 69, as shown in Figure 8, having a reduced portion 71 received in the opening 62 provided in the thrust member 13. The opposite end of the adaptor 69 has a recess 72 adapted to receive one end of the bushing 58, when the latter is pressed into position in the two links, as shown in Figure 8.

In the operation of pressing the new bushing 58 into the links 56, as shown in Figure 8, the bushing is preferably fitted onto a pilot pin 73 having a head 74 intermediately thereof, against which a suitable adaptor collar 75 is fitted. The adaptor collar 75 has a recess 76, similar to the recess 72 in the adaptor 69. Pressure is then applied to the opposite end 77 of the adaptor pin 73 by the ram 5, whereupon the bushing will be forced into the bores of the links 56, the recesses 72 and 76 controlling the projection of the ends of the bushings beyond the outer faces of the links, as will readily be understood. A new pivot pin may then be pressed into the hubs of the links in a manner similar to the operation of removing the pivot pins therefrom, as shown in Figure 5.

Figure 9:
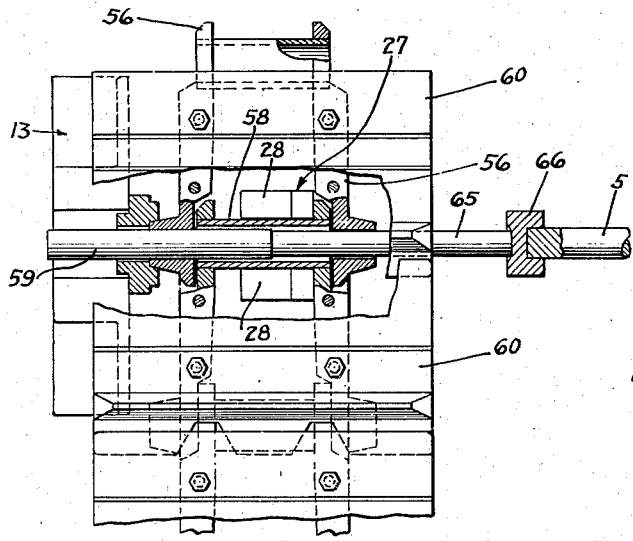
Figure 9 is a plan view of a portion of a traction belt of the "flush" type, showing a pair of its links supported by the thrust member and retractable jaw as when removing a pivot pin therefrom.
Figure 10:
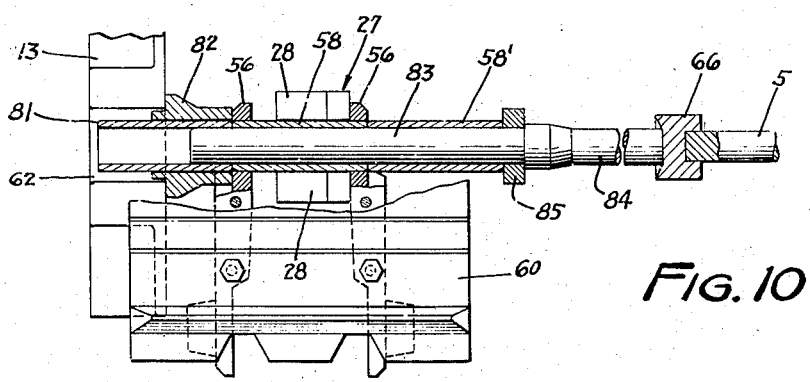
Figure 10 is a view showing the means employed for removing a bushing from links of the type shown in Figure 9, and simultaneously pressing a new bushing into said links.
Figure 11:
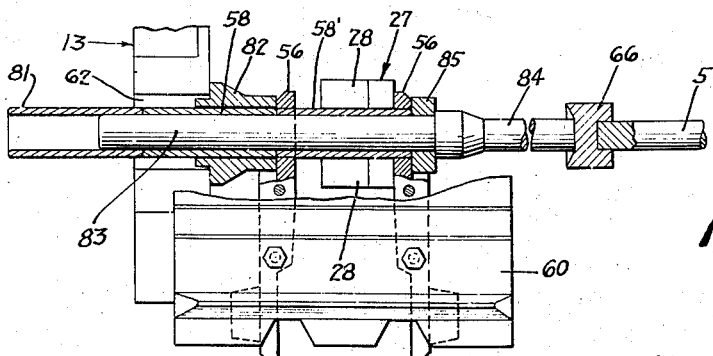
Figure 11 is a view similar to Figure 10, but showing the new bushing pressed into the links.

The pivot pins of the "flush" type traction belt are removed as shown in Figure 9. In this type of traction belt, the ground engaging elements or plates 60 need not be removed from the links, as contiguous pairs of links may readily be separated from one another when the pivot pins are removed therefrom.

A worn bushing of a "flush" type traction belt may be removed simultaneously as the new bushing is pressed thereinto. To thus replace a worn bushing by a new one, a guide sleeve 81 is received in a bore provided in an adaptor 82 which is seated against the thrust member 13. One end of the worn bushing to be removed is then abuttingly engaged with one end of the guide sleeve 81 and a pilot pin 83 having the new bushing 58' mounted thereon, is inserted into the worn bushing 58 and partially into the guide bushing 81. Pressure is then applied to the opposite end 84 of the guide pin 83 by the ram 5, whereupon the new bushing 58' will force the worn bushing 58 out of the links 56 and through the bore in the adaptor 82, until a collar 85 on the pilot pin 83 engages the adjacent face of one of the links 56. During the operation of thus replacing the worn bushing by a new one, the links of the pair of links are independently supported by the thrust member 13 and retractable jaw 27, as will readily be understood by reference to Figure 11, whereby the spacing between the links 56 is accurately maintained. It is also possible, when operating on "flush" type belts, to replace the worn pivot pins and insert new ones without removing the ground engaging elements or plates 60 from the links.

Figure 12:
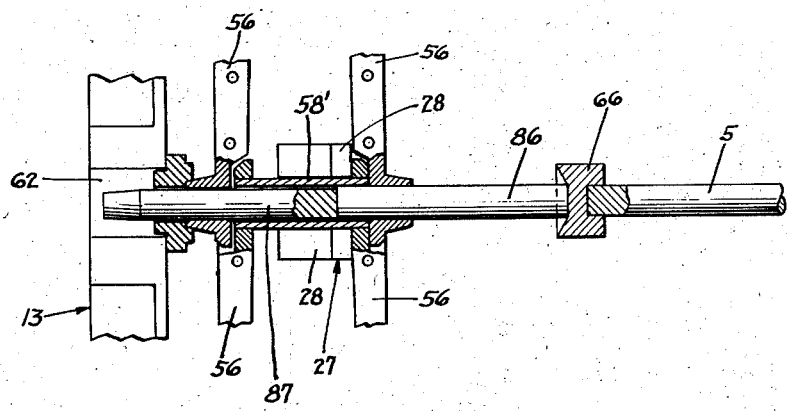
Figure 12 is a view showing a pivot pin being pressed into a pair of links of the type shown in Figure 11.

After the worn bushing has been replaced with a new one, a new pivot pin 86 is pressed into the hubs of the links, as shown in Figure 12. In this operation, a suitable pilot pin 87 is utilized to maintain the bushing in axial alinement with the hubs of the links.

By the use of the novel apparatus herein disclosed, the operation of removing worn bushings and pivot pins from a traction belt and replacing them with new ones is greatly facilitated, as the spacing between the links may be accurately maintained during the operation of forcing the bushings and pins out of or into the links. It will also be noted by reference to Figures 9, 10, and 11, that in traction belts of the "flush" type, the bushings and pivot pins may be replaced without removing the ground engaging elements or plates 60 from the links, whereby the time consumed for replacing the pins and bushings in a traction belt is greatly reduced, with a resultant saving in cost. Also, because the lateral spacing between the links of each pair of links may be accurately maintained, as a result of the retractable jaw, the operation of securing the ground engaging elements or plates 60 to links of the "recessed" type, is greatly facilitated.

I have also found that by the employment of the retractable jaw 27 in combination with the relatively fixed thrust member 13, the apparatus may be operated with greater safety because the links being operated upon cannot shift on the table, when pressure is applied to the pivot pin or bushing. In other words, the retractable jaw positively retains the parts between the link and ram in true alinement during the pressure stroke of the ram, whereby the pusher pin 65 or 67 can not accidentally "fly" out of contact with the pivot pin and ram and injure a workman, when the ram is operated.

I claim as my invention:

1. In an apparatus for repairing a traction belt composed of a plurality of pairs of links and the links of each pair of links normally being secured together in laterally spaced relation and which pairs of links are pivotally connected together by pivot pins and bushings to form an endless traction belt, a table for supporting a portion of the traction belt, a thrust member projecting above the table and adapted to support the outer side of a link of a given pair of said links to provide a lateral support therefor, a pressure member alined with the thrust member and adapted to engage one end of a pivot pin secured to said links, and an abutment jaw mounted for vertical movement relative to the table and adapted to be elevated to a position to support the inner side of the other link of said given pair of links, whereby when said pressure member is operated to force the pin out of said links, each of said links will be laterally supported to maintain normal spacing therebetween.

2. In an apparatus for repairing a traction belt composed of a plurality of pairs of links and the links of each pair of links normally being secured together in laterally spaced relation and which pairs of links are pivotally connected together by pivot pins and bushings to form an endless traction belt, a table for supporting a portion of the traction belt, a thrust member adapted to provide a lateral support for a link of a given pair of said links, said thrust member having an opening therein for receiving a worn pivot pin or bushing removed from said links, a pressure member adapted to engage a pivot pin secured in said links, and a retractable jaw adapted to provide a lateral support for the other link of said given pair of links, whereby said links are independently supported against the pressure exerted on said pin by the pressure member, in the operation of removing the pin from the links.

3. In an apparatus for repairing a traction belt composed of a plurality of pairs of links and the links of each pair of links being secured together in laterally spaced relation by ground engaging plates and which pairs of links are pivotally connected together by pivot pins and bushings to form an endless traction belt, a table for supporting a portion of the traction belt, a thrust member mounted in relatively fixed relation to the table and adapted to support the outer side of a link of a given pair of said links to provide a lateral support therefor, a pressure member adapted to engage one end of a pivot pin secured in said links, an abutment jaw mounted for vertical movement relative to the table and adapted to be elevated to a position to support the inner side of the other link of said given pair of links, whereby when said pressure member is operated to force the pin out of said links, said links will be laterally supported to maintain accurate lateral spacing therebetween, and means whereby the spacing between the thrust member and said jaw may be varied to compensate for variations in the lateral spacing of said links.

4. In an apparatus for repairing a traction belt composed of a plurality of pairs of links and the links of each pair of links being secured together in laterally spaced relation by ground engaging plates and which pairs of links are pivotally connected together by pivot pins and bushings to form an endless belt, a table for supporting a portion of the traction belt, a thrust member projecting above the table and adapted to support the outer side of a link of a given pair of said links to provide a lateral support therefor, a ram adapted to engage one end of a pivot pin secured in said links, an abutment jaw mounted for vertical movement relative to the table and adapted to be moved to a position to support the inner side of the other link of said given pair of links, whereby when the ram is operated to force the pin out of said links, said links will be laterally supported to maintain accurate lateral spacing therebetween, and means whereby said jaw may be laterally adjusted with respect to the ram, thereby to axially aline the pivot pin with the ram.

5. In an apparatus for repairing a traction belt composed of a plurality of pairs of spaced links, which pairs of links are pivotally connected together by pivot pins and bushings to form an endless belt, a thrust member adapted to provide a support for one link of a given pair of said links, said thrust member having an opening therein for receiving a worn pivot pin or bushing removed from said links, a ram for forcing the pivot pin out of said links, a movable jaw adapted to support the other link of said given pair of links, said thrust member and jaw co-operating to relieve said links of excessive strains, when removing worn pins or bushings therefrom or pressing new pins therein, and manually operable means for operating said movable jaw.

6. In an apparatus for replacing worn pivot pins and bushings in a traction belt composed of a plurality of pairs of links and the links of each pair of links being secured together in laterally spaced relation by ground engaging plates and which pairs of links are pivotally connected together by said pivot pins and bushings to form an endless belt, a table for supporting a portion of the traction belt, a thrust member adjacent to the table adapted to support the outer side of a link of a given pair of said links to provide a lateral support therefor, a ram having means adapted to engage one end of a pivot pin or bushing secured in said links, an abutment jaw mounted for vertical movement relative to the table and adapted to be elevated to a position to support the inner side of the other link of said given pair of links, whereby when the ram is operated to force a pivot pin or bushing out of said links, said links will be laterally supported to maintain accurate spacing therebetween, and means for moving said abutment jaw out of the path of the traction belt, whereby the belt may be relatively moved on said table to position another pair of links in operative relation to the ram.

7. In an apparatus for replacing worn bushings in a traction belt composed of a plurality of pairs of links and the links of each pair of links being normally secured together in laterally spaced relation and which pairs of links are pivotally connected together by said bushings and suitable pivot pins to form an endless belt, a table for supporting a portion of the traction belt, a thrust member adapted to laterally support a link of a given pair of said links, said thrust member having an opening therein adapted for receiving a worn bushing removed from said links, a ram, a retractable jaw adapted to laterally support the other link of said given pair of links, whereby said links are independently supported against the lateral thrust exerted on the bushing by the ram, in the operation of removing a bushing from said links and inserting a new one therein, and means associated with the ram whereby the worn bushing may be removed from said links and a new one substituted therefor in a single operation of the ram.

8. In an apparatus for replacing worn bushings in a traction belt composed of a plurality of pairs of links and the links of each pair of links being normally secured together in laterally spaced relation and which pairs of links are pivotally connected together by said bushings and suitable pivot pins to form an endless belt, a table for supporting a portion of the traction belt, a thrust member adapted to laterally support a link of a given pair of said links, said thrust member having an opening therein for receiving a worn bushing removed from said links, a ram, a retractable jaw adapted to laterally support the other link of said given pair of links, whereby said links are independently supported against lateral thrust exerted on the bushing by the ram, in the operation of removing a bushing from said links and inserting a new one therein, and a pilot pin adapted to be inserted through a new bushing and into the bore of the worn bushing to be removed from said links, said pivot pin having a head at one end between which and the worn bushing the new bushing is positioned, whereby when the ram is operated to axially translate the pivot pin, the new bushing will engage the worn bushing and force it out of said links simultaneously as the new bushing is pressed into said links.

9. In an apparatus for repairing a traction belt composed of a plurality of pairs of spaced links, which pairs of links are pivotally connected together by pivot pins and bushings to form an endless belt, a thrust member adapted to provide a lateral support for a link of a given pair of said links, said thrust member having an opening therein for receiving a worn pivot pin or bushing removed from said links, a ram, a movable jaw adapted to laterally support the other link of said given pair of links, whereby said links are independently supported against lateral pressure exerted thereon by the ram, when said ram is operated to remove a pivot pin or bushing from a pair of said links, said movable jaw comprising complemental elongated bars supported adjacent their upper and lower extremities, and the upper extremties of said bars being spaced apart to receive therebetween a bushing mounted in the belt and whereby the bushing to be removed from the belt may readily be alined with the ram.

10. In an apparatus of the class described, a work supporting table having a thrust member adjacent one end thereof, a ram adjacent the opposite end of the table, and a vertically movable jaw interposed between the thrust member and said ram and substantially alined therewith and adapted to cooperate with said thrust member to support certain types of work to be operated upon by the ram, and means for moving said movable jaw out of the path of work supported on the table to facilitate moving the work over the surface of the table.

11. In an apparatus of the class described, a work supporting table having a thrust member adjacent one end thereof, a ram adjacent the opposite end of the table and alined with said thrust member, a vertically movable jaw interposed between the thrust member and said ram and substantially alined therewith and adapted to cooperate with said thrust member to support certain types of work to be operated upon by the ram, means for moving said movable jaw out of the path of work supported on said table, means for laterally adjusting said jaw with respect to the axis of the ram, and means for varying the spacing between the thrust member and the jaw.

12. In an apparatus of the class described, a work supporting table having a thrust member adjacent one end thereof, a ram adjacent the opposite end of the table, a vertically movable jaw interposed between the thrust member and said ram and substantially alined therewith and adapted to cooperate with said thrust member to support certain types of work to be operated upon by the ram, means for moving said movable jaw out of the path of work supported on the table, said jaw comprising a pair of upright members having their upper ends spaced apart to receive a portion of the work therebetween, and means for varying the spacing between said upper ends.

JAMES S. RODGERS.